Dec. 14, 1943. W. H. MILLER 2,336,496

SELECTIVE MAP OR CHART HOLDER

Filed Aug. 29, 1941

Inventor
William H. Miller

By
H. F. Doyle
Attorney

Patented Dec. 14, 1943

2,336,496

UNITED STATES PATENT OFFICE 2,336,496

SELECTIVE MAP OR CHART HOLDER

William H. Miller, Louisville, Ky.

Application August 29, 1941, Serial No. 408,700

2 Claims. (Cl. 40—84)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to and has for a purpose the provision of a selective map or chart holder and is especially adapted to provide a device whereby an individual may select the map or chart desired from the group for inspection.

The principal object of the invention is to provide a device whereby a selection of maps or charts are grouped in a holder which provides means for selecting and sheathing one of the maps or charts while protecting and preserving the remainder of the group which are not in use.

Another object of the invention is to provide a device that will permit any one of the maps or charts selected to take the same position as the one which has been drawn and is desired to be returned to the holder.

This device may be intended for use in field work or any other application, for stated purposes, and may be also intended for use of road maps, whereby a number of maps are inserted in the cylinder and used selectively.

For such purposes maps can easily be removed and replaced with other maps desired of a size to fit within the cylinder. In this manner, road maps of consecutive states or territories may be placed within the cylinder and selected at will on trips covering a number of States or territories. If identifications are placed on the indicator it will be necessary to change such identifications if the maps or charts are changed.

With the above and other objects and advantages in view, the invention consists of features of construction, arrangement and operation of parts which will appear later in the specification.

While a preferred embodiment of the invention is shown, it will be understood that slight changes in form and minor details of construction may be resorted to without departing from the spirit of the invention and fall beyond the scope of the claims.

Referring now to the drawing in which similar characters and references in the several figures indicate identical parts:

Figure 1:
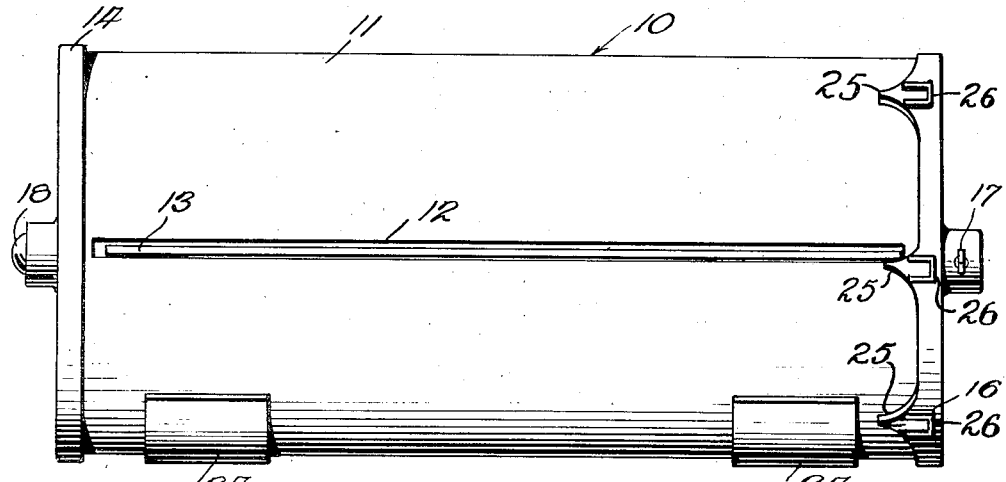
Fig. 1 is a bottom view of the device.
Figures 2, 3:
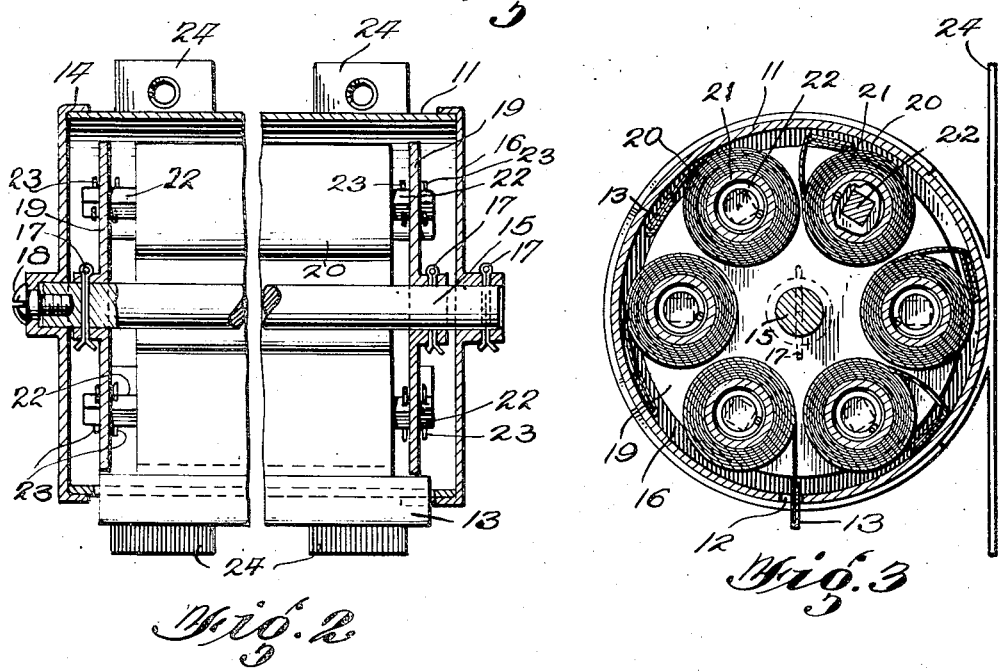
Fig. 2 is a vertical section broken through the device.
Fig. 3 is a transverse section.

Reference now being had to the drawing by numerals, in which 10 indicates the complete assembly, which consists of a tube or cylinder 11 in which the mechanism is housed. The cylinder 11 has an elongated slot 12 which extends from a point near one end to a corresponding point near the opposite end, the slot 12 being of a sufficient width to permit the metal binder strip 13 to drop through the slot when the mechanism is turned to a point so that the selected map or chart may be emitted.

At one end of the tube 11 and securely fastened thereto is an end piece 14 which forms the end housing and also the end bearing for the shaft 15.

At the opposite end of the tube 11 is an indicator or end piece 16 which forms the end housing and selector 16. This indicator or selector 16 is made so that it can rotate around the outer surface of the tube 11 by reason of the fact that it is secured to the shaft 15 by any well-known means, a cotter pin 17 being shown as an illustration. The indicator therefore can be rotated counter-clockwise so that the metal binding strip 13 of the selected map or chart will drop through the slot 12 in the cylinder 11 and be drawn into use by pulling down in the manner of a window shade.

The indicator 16 has a series of projections 25 which are adapted to co-act with the slot 12 in order to indicate the position of the desired map. Positioned on each of the projections 25 is an indicia holder 26, the title of the individual map is placed in the appropriate holder, therefore the operator will know what map to select and when the projection 25 aligns with the opening 12, the desired map can be exhibited.

The shaft is retained in place and the entire assembly is held together as a unit by means of a screw 18 which is threaded into the shaft 15. Mounted on the shaft 15 at a sufficient width to permit the maps or charts to be mounted therein are holders 19 which are securely fitted to the shaft by any well-known means, cotter pins 17 being shown as an illustration, thereby permitting the holders 19 to rotate with the shaft 15.

Each of the maps or charts 20 is mounted on a retrieving type spring roller 21 which is constructed similar to a window shade roller. Each roller is fitted with a square shaft 22 which is adapted to be fitted into square holes in the holders 19. The map rollers are prevented from moving laterally by means of two small guide pins 23 which are inserted in openings in the shaft 15 on the inside and outside of the holders 19.

The holders 19 also act as stops for the maps or charts when they are being sheathed for the reason that one end of the metal binding strip 13 projects beyond the sides of the maps or charts a sufficient distance, thus preventing the maps or charts from winding too far on the roll and becoming inaccessible. The map or chart when being sheathed leaves a portion of the metal binding strip 13 projecting from the cylinder which is drawn into the cylinder when the indicator 16 is turned. Therefore, this metal binding strip serves several purposes, namely, it is a reinforcing protection for the lower edge of the map or chart; it also acts as a stop in sheathing the map, prevents the corners of the map from curling when unsheathed and provides a grip for unsheathing the map when desired.

While the device is illustrated as a cylinder containing only six different maps or charts it is not to be understood as restricting the invention to this number, since the number may be varied according to the number of maps desired to be contained within the cylinder housing.

Also any number of groups may be placed in selective assembly and when not in use may be stored as complete units, thus forming protection for maps during storage.

The operation of the device may now be readily understood from the foregoing description. The device is adapted to be mounted on suitable brackets, one form being illustrated as at 24, and can be placed on a wall, door, etc., inside a vehicle or on any other vertical surface.

In order to select a map, turn the indicator 16 counter-clockwise until the identification on the indicator indicates the maps or charts in the housing desired, at which time the metal binding strip 13 will drop through the slot 12 at the bottom of the cylinder. The strip 13 can then be grasped and pulled downward in the manner of a window shade. To sheath the map the metal strip is pulled downward to permit the roll to reroll on its spring roller in the manner of raising a window shade. Another map may then be selected and unsheathed in like manner.

Groups of maps within a unit may be changed at will by the following method: The screw 18 in the end of the shaft 15 is first removed and by grasping the indicator 16 the entire assembly may be removed from the cylinder 11, making certain before removal thereof that all metal binding strips are within the cylinder.

After the assembly has been removed the maps or charts may be removed and replaced by pulling out the pins 23 at the outer end of the square roller shaft 22 and backing the roller shaft out of the hole in the holder. Insertion of maps is made in the reverse sequence.

To replace the assembly in the cylinder, grasp the indicator 16 and insert the assembly into the cylinder, guiding the end of the shaft into the bearing in the end piece 14 and the screw 18 is then replaced in the shaft 15 and tightened. The use of a screw such as shown will permit the rotation of the assembly and will also prevent the assembly from moving laterally. The names or number of maps and charts may be placed on the indicator for identification purposes and may be done in any suitable manner to permit readily changing such names or numbers to correspond with the new maps to be inserted.

There should also be a sufficient margin between the maps or charts and the top of the sheet where attached to the roller, to allow full exposure of the map or chart without unrolling the sheet to its limit.

The invention therefore exemplifies a map or chart holder which enables the expeditious selection of any one of a group of maps or charts which are used within the cylinder.

It will be understood, therefore, by those skilled in the art, that the embodiment of the invention herein disclosed accomplishes the principal object of the invention. It also has uses and advantages other than those herein particularly referred to, since the maps or charts used in the explanation of the device may be supplemented or changed to other articles of similar character without departing from the scope of the invention.

Also, that various changes and modifications may be made without departing from the spirit of the invention and since the embodiment disclosed herein, being only illustrative of the device, the invention is not to be restricted thereto, since this may be modified within the scope of the appended claims without departing from the spirit and scope of the invention.

Having thus described the invention, what is claimed as new and desired to secure by Letters Patent is:

1. A map or chart holder, comprising a fixed cylinder provided with a longitudinal slot, said cylinder being closed at both ends by removable end pieces, a shaft connected at its ends to said removable end pieces, means for quickly detaching one of said end pieces from said shaft, a revolvable frame adapted to receive a collection of maps or charts mounted on said shaft, said frame thereby being adapted to revolve within said cylinder, a series of spring retrieving rollers mounted in said revolvable frame, said maps or charts adapted to be mounted at one end on said spring retrieving rollers and adapted to receive at the other end a binding strip, said binding strip adapted to act as a stop to prevent said maps or charts from winding too far on said roller, said end pieces adapted to revolve, said frame to bring said binding strip in cooperative position with said longitudinal slot, so that said map or chart can be withdrawn from said cylinder.

2. A map or chart holder, comprising a fixed cylinder provided with a longitudinal slot, said cylinder being closed at both ends by removable end pieces, a shaft connected at its ends to said removable end pieces, means for quickly detaching one of said end pieces from said shaft, a revolvable frame adapted to receive a collection of maps or charts and revolve on said shaft within said cylinder, said removable end pieces adapted to act as bearings for said shaft, a series of spring retrieving rollers mounted between said removable end pieces, said maps or charts adapted to be mounted at one end on said spring retrieving rollers and adapted to receive a binding strip at the opposite end thereof, said binding strip adapted to act as a stop to prevent said maps or charts from winding too far on said roller, said end pieces adapted to revolve, said frame to bring said binding strip in cooperative position with said longitudinal slot and means on said revolving means for identifying the map or chart desired to be withdrawn from the cylinder.

WILLIAM H. MILLER.